Figure 1:
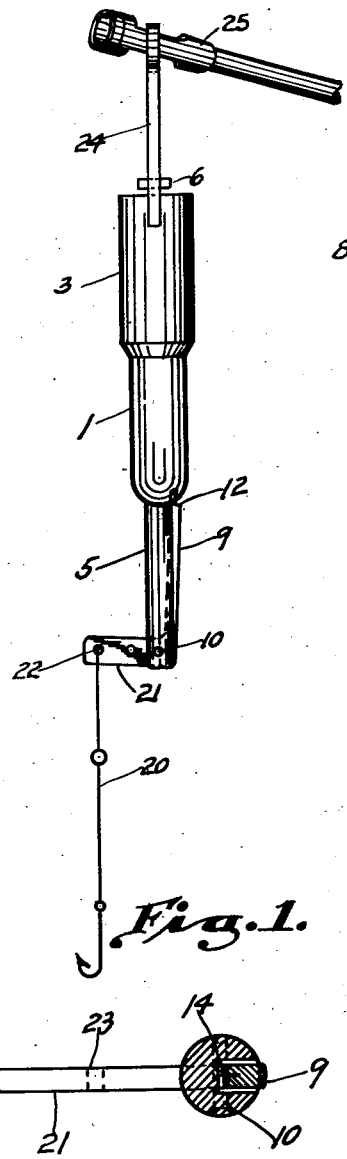

July 16, 1957     I. E. REMINGTON     2,799,109

DEEP SEA FISHING DEVICE

Filed Jan. 31, 1955

INVENTOR.
Insco E. Remington
BY Chas. Denegre
Attorney.

2,799,109
DEEP SEA FISHING DEVICE

Insco E. Remington, Fairfield, Ala.

Application January 31, 1955, Serial No. 484,880

1 Claim. (Cl. 43—15)

This invention relates to a deep sea fishing device. It has for its main objects to provide such a device that will be highly satisfactory for the purpose intended, simple in structure, comparatively cheap to manufacture, easy to use and keep in working condition, and extremely durable.

A further object is to provide a device that will overcome the objection of what is known as the curve in the line when deep sea fishing caused by the tide flowing against the line between the surface of the water and the sinker on the lower end of the line. When a line is in this condition the jerk of the fisherman often fails to hook the fish. The present invention eliminates this objection by providing the jerk at the bait end of the line.

The device is not limited to deep sea fishing and will prove satisfactory in any body of water.

Other objects and advantages will appear from the drawing and description.

Figure 4:
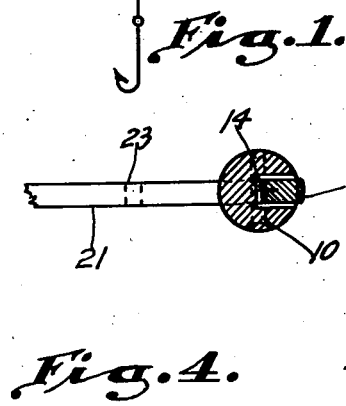
Figure 2:
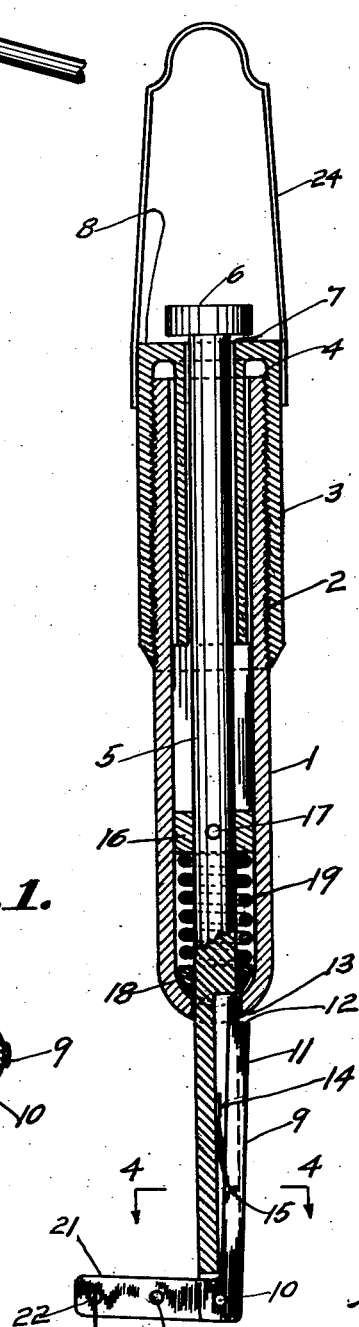
Figure 3:
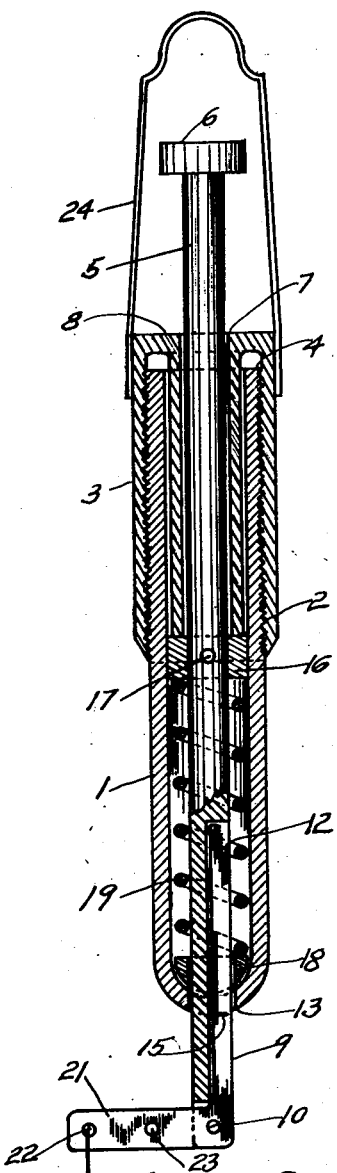

By referring generally to the drawing, a part of this application, it will be observed that Fig. 1 is a side elevational view of the device made according to this invention with a fishing hook attached and a line rod indicated at the upper end; Fig. 2 is a vertical center sectional view showing the device in condition for use on a fishing line assuming it is provided with a fishing hook with bait thereon; Fig. 3 is a vertical center sectional view showing the device as it would appear with fish caught on a baited hook; and Fig. 4 is a detail sectional view on line 4—4 of Fig. 2 showing the trigger spring in place for use.

Similar reference numerals refer to similar parts throughout the several views.

Referring to the drawing in detail it will be seen that the device comprises a round body having the lower part 1 which is provided with screw threads 2 in its upper outer face, and an upper part 3 with screw threads 4 in its inner face adapted for screwing onto the lower part. A rod 5 with a cap 6 extends through a hole 7 in the top 8 of the upper body part, and down through and beyond the lower end of the lower body part. The lower portion of the rod is provided with an L-shaped trigger 9 pivoted at 10 to the bottom end of the rod with upper end 11 formed with a shoulder 12 adapted to make contact with the edge of hole 13 in the lower end of the body part when expanded outward by the flat spring 14 attached to the trigger at 15 as plainly shown in Figs. 2 and 3. A piston 16 is attached by a pin 17 on the rod. A sleeve 18 is provided to fit around the rod where it extends through the hole in the bottom of the lower body part. A coil type spring 19 is mounted around the rod between the piston and sleeve and is set in tension to force the rod upward when the trigger is pulled to release the rod by a jerk on the hook line 20 attached to the horizontal portion 21 of the trigger in hole 22. The other hole 23 may be used if it is desired to require a stronger pull on the trigger to release it. The upper body portion is provided with an integral handle 24 for attaching a fishing line (not shown) thereto or for mounting on a fishing rod 25 as shown in Fig. 1.

From the foregoing it will appear that in order to use the device on a fishing line it is set by manual means as it appears in Figs. 1 and 2. In its released condition it will appear as in Fig. 3. The flat spring holds it set with the coil spring compressed. When a fish jerks the hook and thus releases the trigger the coil spring almost simultaneously jerks upward and hooks the fish.

The device may be made of any material suitable for the purpose, but I prefer to use good grades of metal; also it may be made in different sizes and capacities depending on how and where to be used.

While I have shown and described the preferred embodiment of my invention, I do not wish to limit same to the exact and precise details of structure, but reserve the right to make all modifications and changes so long as they remain within the scope of the invention and the following claim.

Having described my invention I claim:

A fishing device of the character described comprising a round hollow elongated body, said body having a lower part with screw threads in the outer face of its upper portion, and an upper part with screw threads in all of its inner face and being adapted to screw upon the lower body part, the upper body part having an integral top portion with a hole therethrough, and the lower body part having a rounded bottom with a hole therethrough, a rod, said rod having an integral cap, said rod extending through and beyond the bottom end of the lower body part, an L-shaped trigger pivotally mounted between its ends on the bottom portion of the rod, a spring in the trigger for holding it set with one end engaging the bottom end of the lower body part, a piston attached by a pin to the center portion of the rod, a sleeve mounted around the rod adjacent the hole in the bottom of the lower body part, a coil type spring mounted around the rod and between the piston and the sleeve and set in tension to force the rod upward in the body when the trigger is released, the other end of said trigger having holes therein adapted for attaching a fishing hook thereto, and a handle attached to the upper end of the upper body part adapted for a fishing line to be attached thereto.

References Cited in the file of this patent

UNITED STATES PATENTS

| | | |
|---|---|---|
| 223,194 | Vache | Dec. 30, 1879 |
| 1,383,474 | Lucas | July 5, 1921 |
| 1,747,033 | Shireman | Feb. 11, 1930 |
| 1,989,407 | Ezell | Jan. 29, 1935 |
| 2,144,175 | Zonn | Jan. 17, 1939 |
| 2,712,194 | Stefano | July 5, 1955 |
| 2,726,470 | Bass et al. | Dec. 13, 1955 |

FOREIGN PATENTS

| | | |
|---|---|---|
| 40,337 | Norway | Nov. 24, 1924 |